United States Patent [19]

Lee

[11] Patent Number: 4,537,079
[45] Date of Patent: Aug. 27, 1985

[54] MULTI-PRESSURE MANOMETER

[76] Inventor: Arnold S. J. Lee, 1033 Hilts Ave., Los Angeles, Calif. 90024

[21] Appl. No.: 589,147

[22] Filed: Mar. 13, 1984

[51] Int. Cl.³ .............................................. G01L 7/18
[52] U.S. Cl. ...................................................... 73/747
[58] Field of Search ................... 73/747, 327; 350/112

[56] References Cited

U.S. PATENT DOCUMENTS

| | | | |
|---|---|---|---|
| 2,562,494 | 7/1951 | Hejduk | 73/747 |
| 2,849,883 | 9/1958 | Chapman | 73/747 |
| 3,118,305 | 1/1964 | Weeks | 73/747 |
| 4,380,173 | 4/1983 | Wozniak | 73/747 |

Primary Examiner—Donald O. Woodiel
Attorney, Agent, or Firm—Freilich, Hornbaker, Rosen & Fernandez

[57] ABSTRACT

A relatively simple and compact apparatus is described for producing and/or monitoring a plurality of reference pressures wherein all the pressures must be precise and, especially, precisely related to each other. The apparatus includes a plurality of manometers, each including a reservoir and an elongated vertical tube connected together at their lower ends and partially filled with a manometer liquid such as mercury. As an example, a first (lower) reference pressure such as 150 torr (150 mm Hg) is connected to the reservoir of a first manometer while a second reference pressure such as 300 torr is connected to the reservoir of a second manometer of the same construction. The liquid in the vertical tubes will be at the same level only when the second reference pressure is precisely twice as great as the first.

3 Claims, 5 Drawing Figures

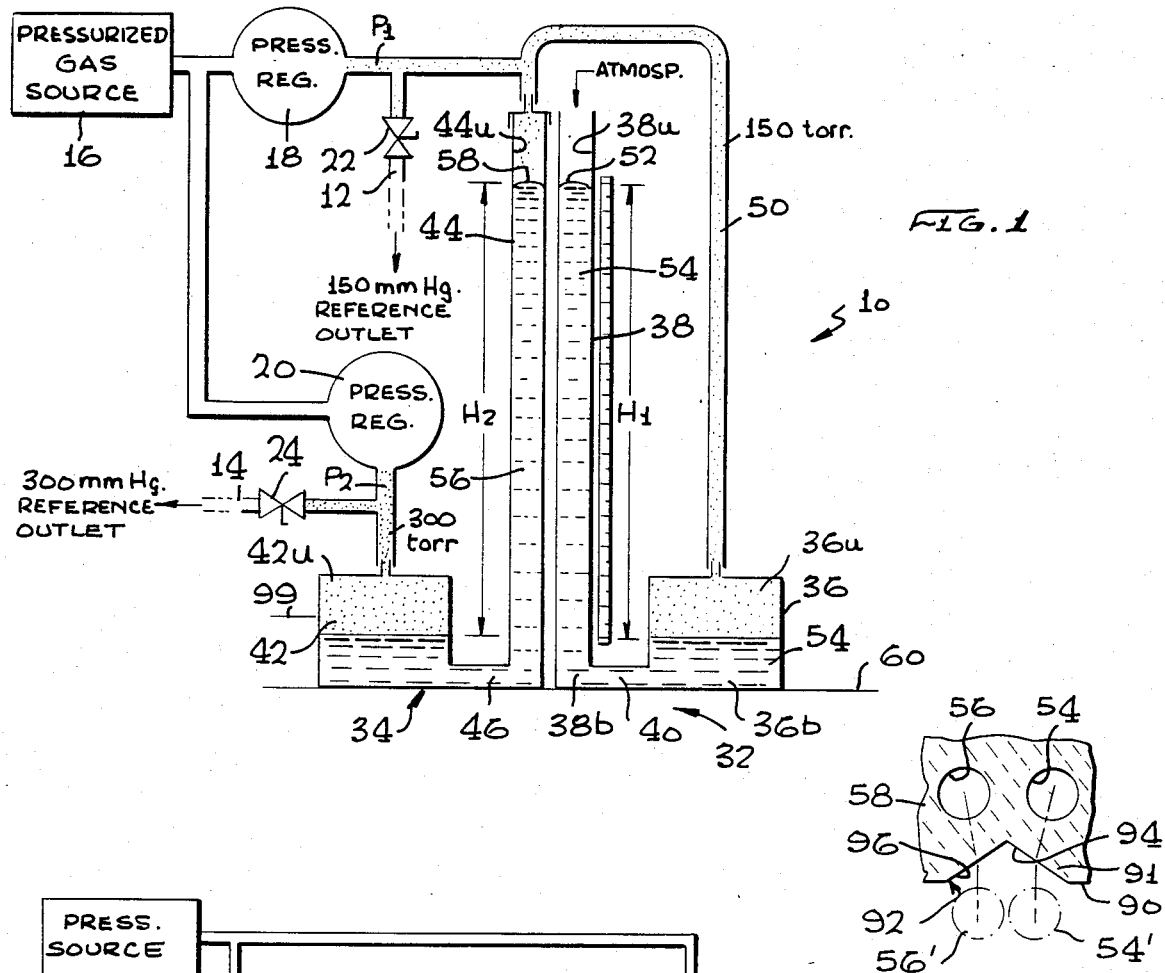
FIG. 1
FIG. 3
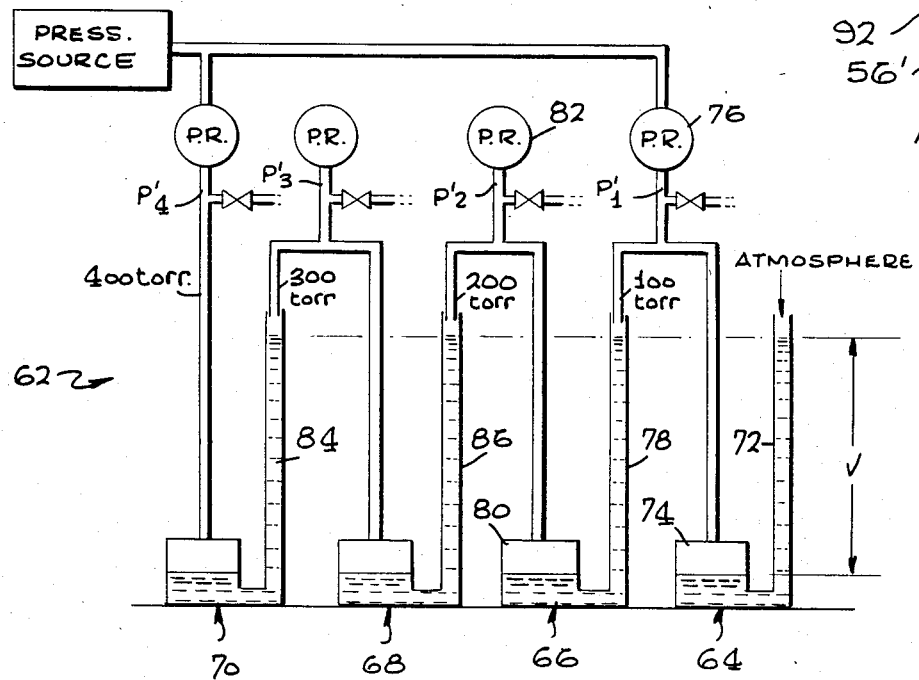
FIG. 2

MULTI-PRESSURE MANOMETER

BACKGROUND OF THE INVENTION

There are applications where a group of gas pressures are required that are accurately related to each other, as in the testing of transducers. The usual approach in monitoring such pressures is to use a group of manometers, each being used to measure one of the pressures, or to use a single monometer connected in turn to each of the pressures. Manometers containing mercury are often used. The height of a column of mercury in a transparent tube can be measured by comparing the top of the column to gradations etched in the tube. However, it is difficult to determine precisely where the top of the column lies with respect to a marking, because of the meniscus at the top of the column. A lighter manometer liquid such as water is also used, which enables greater precision in measurement. For most measurements of pressures, water columns are too high to enable their inclusion in compact instruments. Even a mercury column may be too tall for inclusion in a compact instrument where the highest pressure exceeds 3 psi. For example, to measure a pressure of 300 torr (about 6 psi) requires a mercury column whose top is about 360 mm tall (about 14 inches). A manometer arrangement which substantially reduced the height required for manometers to be used for measuring two or more pressures, while also enhancing the accuracy of comparative measurements of the tops of manometer liquid columns with respect to markings and to each other, would be a considerable improvement.

SUMMARY OF THE INVENTION

In accordance with one embodiment of the present invention, a compact apparatus is provided for monitoring and producing a plurality of reference outlet pressures that are accurate, and accurately related to each other. The apparatus includes at least two manometers, each having a reservir and an elongated vertical tube whose lower ends are connected together and which contain a manometer liquid. The upper end of the first (lowest pressure) manometer tube is open to a predetermined constant base pressure such as atmospheric, while the upper end of the first reservoir is connected to the upper end of the second manometer tube. A first pressure regulator is coupled to the pressure at the upper end of the first reservoir, while a second pressure regulator is coupled to the upper end of the second reservoir. In one case, the liquid levels in the reservoirs are at the same levels at zero pressure. When pressure is applied and the liquid columns in the two vertical tubes are of an identical height, the pressure at the upper end of the second reservoir is precisely twice the pressure at the upper end of the first reservoir. The heights of the liquid columns in the two vertical tubes can be accurately compared to one another to produce a second pressure precisely twice that of the first. The total height of the manometer is reduced.

Even though the tubes are separated, they can be compared as though they were very close together, by placing a prism, or for symmetry, a pair of parallel prisms in front of the tubes, so that when a person faces the V-shaped groove, formed by the prisms, each tube's refracted image may be made to appear to be very close to the other, even partially superimposed.

The novel features of the invention are set forth with particularity in the appended claims. The invention will be best understood from the following description when read in conjunction with the accompanying drawings.

BRIEF DESCRIPTION OF THE DRAWINGS

FIG. 1 is a diagramatic view of a multi-pressure manometer constructed in accordance with one embodiment of the present invention.

FIG. 2 is a diagramatic view of a multi-pressure manometer constructed in accordance with another embodiment of the invention.

FIG. 3 is a partially sectional view of a multi-pressure manometer constructed in accordance with another embodiment of the invention.

DESCRIPTION OF THE PREFERRED EMBODIMENTS

Figure 4:
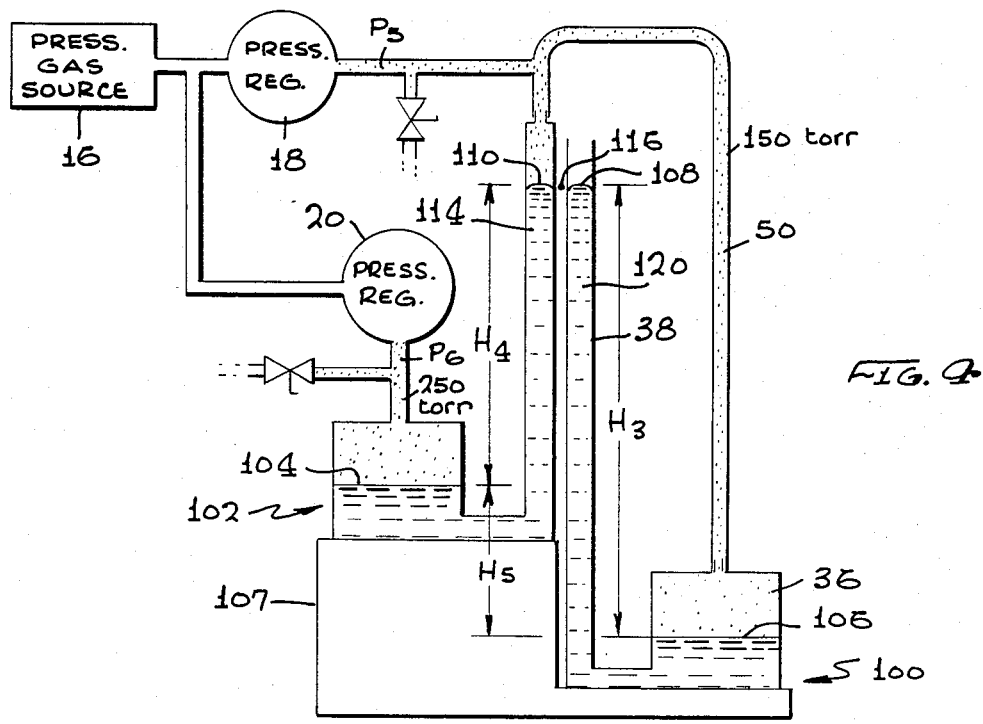
FIGS. 4 and 5 are diagramatic views of apparatus in accordance with other embodiments of the invention.

FIG. 1 illustrates an apparatus which has a pair of reference pressure outlets 12, 14 which deliver a gas, such as air, at reference gage pressures $P_1$ and $P_2$, respectively. The reference pressures are required to be precisely related, with the second reference gage pressure $P_2$ at 14 being required to be precisely twice the reference gage pressure $P_1$ at 12 ("gage" means with respect to atmospheric pressure). The equipment includes a pressure gas source 16 which is connected to a pair of pressure regulators 18, 20 that supply pressure through valves 22, 24 to the reference outlets. Each pressure regulator is of the type which can be finely adjusted to provide a stable desired outlet pressure. The pressure regulators' outputs are connected to a pair of manometers 32, 34. The first manometer 32 includes a first reservoir 36 and a first elongated vertical tube 38, whose lower ends 36b, 38b are connected together through a lower coupling 40. A manometer liquid such as mercury lies within the reservoir and tube, and in the coupling 40 that extends between them. The second manometer 34 is similarly constructed, with a second reservoir 42, second tube 44, and second coupling 46 connecting their lower ends. The upper ends of the reservoirs and tubes contain a gas such as air.

The pressure at the outlet of the first pressure regulator 18 is connected, through an upper coupling 50, to the upper end 36u of the first reservoir. The upper end 38u of the first vertical tube is at a predetermined, or base, pressure such as atmospheric pressure by opening it to the atmosphere. As a result, the pressure on the reservoir 36 causes liquid in the tube 38 to rise to a particular level 52 which is proportional to the pressure on the first reservoir. For the particular example shown in FIG. 1, wherein the manometer liquid 54 is mercury and the pressure $P_1$ applied to the first reservoir is 150 mm Hg, or 150 torr, the height $H_1$ of the top 52 of the column above the top of the reservoir, represents the difference in pressure at the top of the column and at the top of the reservoir (with a minor correction for mercury column wall repulsion depending upon the vertical tube diameter and material).

The upper coupling 50 also connects the upper end 36u of the first reservoir to the upper end 44u of the second tube. With the second pressure regulator 20 applying a pressure $P_2$ of 300 torr to the upper end 42u of the second reservoir, the difference in pressures $(P_2-P_1)$ between the upper ends of the second tube 44 and second reservoir 42 is 150 torr, and the height $H_2$ of the second column 56 will also be 150 mm. As a result, the top 58 of the second column will be precisely at the same level as the top 52 of the first column when the second pressure $P_2$ is precisely twice as great as the first pressure $P_1$. This 2:1 ratio will exist so long as the tops 52,58 of the two columns are at the same level. Of course, if the pressures $P_2$ and $P_1$ are to be 200 torr and 100 torr respectively, then the heights 52, 58 of the columns will be lower, but they will still be at precisely the same level.

It would be possible to measure the two pressures $P_2$ and $P_1$ using two separate and unconnected manometers. However, the connection of the manometers as shown in FIG. 1, has important advantages over the use of such separate manometers. A first advantage is that the tops of the two columns 52, 58 can be placed adjacent to one another so that they can be compared. It is generally difficult to determine when the top of a manometer column is precisely at a gradation marked on a tube. Such difficulty arises because the top of the column forms a meniscus, which is convex in the case of mercury lying in a glass tube. There is a difference in height between the top, middle, and bottom of the meniscus. However, when two identical tubes are placed side-by-side, it is easier to precisely determine when the meniscuses of the two tubes are at precisely the same level.

Another advantage of the apparatus of FIG. 1, is that the manometer whose reservoir is at a higher pressure $P_2$, does not have to be of great height in order to accurately measure that pressure. Where the second reference pressure $P_2$ is 300 torr, a prior art manometer would require a mercury column of 300 mm height. In FIG. 1, the same pressure of 300 torr is obtained using a column height $H_2$ of only 150 mm. Where only the higher pressure $P_2$ is needed, and the two-manometer arrangement is used merely to reduce the height of the second manometer, the first reference pressure outlet 12 is not needed.

In order to enable operation of the apparatus as described above, the ratio of the diameter of the first tube 38 to the diameter of the first reservoir 36, must be the same as the ratio of diameters of the second tube 44 to the second reservoir 42. This can be accomplished by using similar manometers, having the same diameters of vertical tubes and reservoirs.

FIG. 2 illustrates another apparatus 62 which produces four pressures $P'_1$, $P'_2$, $P'_3$, and $P'_4$, that are precisely related to each other in that each pressure is a certain level above the previous one, such as 100 torr above the previous pressure. Thus, the first pressure $P'_1$ is 100 torr, while the fourth pressure $P'_4$ is 400 torr. The apparatus includes four manometers 64,66,68 and 70. The first manometers 64 has a tube 72 whose upper end is open to the atmosphere, and a reservoir 74 which is connected to a pressure regulator 76. With the pressure regulator 76 producing a pressure $P'_1$ of 100 torr, the vertical height V of the column in the first tubes 72 is 100 mm above the top of mercury in the first reservoir. The top of the first reservoir 74 is connected to the top of the second tube 78. The top of the second reservoir 80 is connected to a second pressure regulator 82 whose output $P'_2$ must be precisely 200 torr in order that the height of the second column in tube 78 be equal to the height V of the first column. The reservoirs and tubes are simialrly connected, with the top of the reservoir of the last manometer 70 connected to a pressure $P'_4$ of 400 torr. It can be appreciated that the height V of mercury in the fourth column 84 is only one-fourth the height that would be required if a single manometer were to be used to measure a pressure of 400 torr. The four tubes 72, 78, 84, and 86 should be arranged so that they are closely adjacent so that their heights can be compared to each other, or at least to etch marks on their respective tubes.

The reservoirs and elongated vertical tubes of two or more manometers can be rigidly held together by forming them as bores in a single housing. FIG. 3 shows the pair of tubes 54, 56 of FIG. 1 as bores in a transparent plastic housing 58. While it would be desirable to place the vertical bores 54, 56 immediately adjacent to each other, it is necessary to separate them in constructing the device. Even though the tubes are separated, the heights of liquids in them can be compared as though the tubes were immediately adjacent to one another, by forming the outer surface 90 of the housing into dual parallel prism by a V-shaped groove 92. The prismatic regions or prisms 91, 93 formed by the groove, results in a pair of walls 94, 96 that converge. The walls 94, 96 are positioned so that when a person views the tubes 54', 56' through the walls 94, 96, the two tubes appear as indicated at 54', 56', as though they were much closer together, even partially superimposed, than in reality. This is due to the fact that the material of the housing 58, of a material such as acrylic plastic, has a higher index of refraction (above 1.0) than air, so that light is refracted at the plastic-air interface. The result of the two tubes 54, 56 appearing to be closer together than they actually are, facilitates comparision of the levels of manometer fluids in the tubes.

While a pair of identical manometer such as 32,34 in FIG. 1, can be used to generate and measure two pressures that are in a 2:1 ratio, they also can be used to measure two pressures that differ by a predetermined amount. FIG. 4 illustrates two manometers 100, 102 similar to those of FIG. 1, except that the top 104 of the second reservoir is at a level which is a distance $H_5$ of 50 mm higher than the top 106 of the first reservoir. This can be accomplished by using a support 107. When the tops 108, 110 of the two liquid columns 112, 114 are at equal heights, the second reservoir pressure $P_6$ will be 50 torr less than twice the first reservoir pressure $P_5$. By contrast, in FIG. 1 the manometer liquid in the two tubes and reservoirs are all at the same level 99 when the base pressure (atmospheric) is applied to the upper ends of all tubes and reservoirs, so $P_2$ is precisely twice $P_1$.

Figure 5:
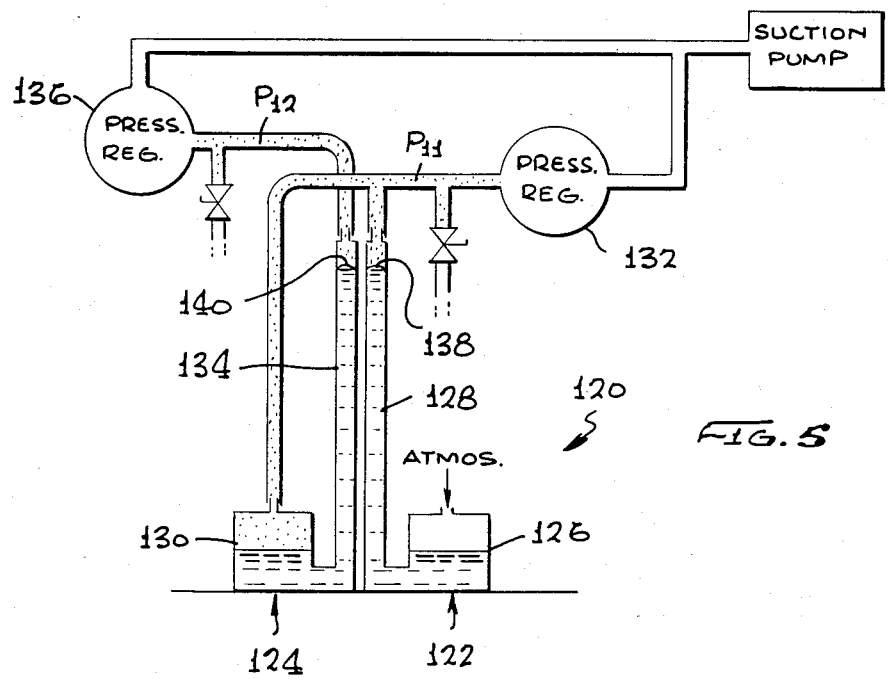

In the above examples, the pressures such as $P_1$ and $P_2$ have been positive gage pressures, that is, pressures above atmospheric. However, the same apparatus can be used to measure vacuum, or negative gage pressures. FIG. 5 illustrates an apparatus similar to that of FIG. 1, except that the pressures $P_{11}$ and $P_{12}$ are vacuum gage pressures, with the absolute value of $P_{12}$ being precisely twice $P_{11}$. The apparatus 120 includes two identical manometers 122, 124, with the first reservoir 126 open to the atmosphere and the first vertical tube 128 connected to the second reservoir 130. The first tube 128 is connected to a first pressure regulator 132 while the second tube 134 is connected to a second pressure regulator 136. When the tops 138, 140 of the two columns are equal, the negative gage pressures are in a 2:1 ratio. For example, $P_{11}$ may be at a gage pressure of 100 torr (below atmospheric) while $P_{12}$ would be at a gage pressure of $-200$ torr.

Thus, the invention provides apparatus for monitoring at least two reference pressures, wherin the second pressure is precisely related to the first, such as where it is twice as great as the first, in a relatively compact and accurate instrument. This can be accomplished by connecting the reservoir of a first manometer to the top of the vertical tube of the second manometer. For positive pressures, first and second pressure regulators are connected to the reservoirs of the first and second manometers. For negative gage pressures, the pressure regulators are connected to the tops of the first and second vertical tubes of the manometers.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. In a measuring apparatus which includes a pair of spaced vertical tubes which each contain liquid, and pressure means adjustable for pushing the liquid in the tubes up to the same level, the improvement comprising:
    a housing of transparent material having an index of refraction greater than 1.0, said housing having a pair of spaced tubes and forming an outer viewing surface spaced in front of said tubes, said viewing surface including a pair of light-refracting walls which are angled toward each other to form at least part of a V-groove in the outer surface of the housing, said light-refracting walls positioned to refract light from said pair of tubes so that to an observer facing said viewing surface walls the tubes appear closer together than actual separation.

2. Apparatus for monitoring and/or producing first and second reference outlet pressures wherein the second outlet pressure is precisely related to twice the first outlet pressure, with respect to a base pressure comprising;
    first and second manometers, each having an elongated vertical tube and a reservoir, the ratio of cross-sectional areas of the tube of a manometer to its reservoir being the same for both manometers, each tube and each reservoir having upper and lower ends, and the lower ends of the tube and reservoir of the same manometer connected together;
    a manometer liquid lying in the lower end of each tube and reservoir, and the upper ends of the reservoirs and tubes containing gas, the gas in the upper end of said first manometer tube being at said base pressure;
    first and second regulated pressure sources, said first source having an outlet coupled to the gas at the upper end of said first manometer reservoir, and said second source having an outlet coupled to the gas at the upper end of said second reservoir, each regulated pressure source being adjustable to finely control the pressure in its outlet;
    an upper coupling connecting the upper end of the first manometer reservoir to the upper end of the second manometer tube so the gases therein are at the same pressure;
    first and second pressure reference outlets coupled respectively to the outlets of said first and second pressure sources, for providing access to the first and second reference outlet pressures;
    said tubes being positioned so the levels of liquid therein can be compared; and
    said apparatus includes a pair of parallel prisms placed in front of the adjacent vertical tubes, so that said tubes appear closer together than their actual separation, to a person viewing said tubes through said prisms.

3. Apparatus for producing a number n of reference outlet pressures, where n is an integer that is more than one, wherein each outlet pressure is precisely related to every other outlet pressure, comprising:
    a number n of reservoirs, each having an upper portion containing gas and a lower portion;
    a number n of vertical tubes, each having upper and lower portions, the upper portions of the tubes being positioned so the levels of any liquids therein can be compared;
    a number n of lower couplings, said reservoirs and tubes arranged in pairs, with each lower coupling connecting together the lower portion of a reservoir and of a tube of the same pair;
    a manometer liquid lying in each lower coupling and the lower portions of the reservoir and tube it connects;
    a number n-1 of upper couplings, each containing gas and connected to the upper portion of a reservoir of one of said pairs to the upper portion of a tube of another pair;
    means for establishing a base pressure in the upper portion of that one of said tubes which is not connected to an upper coupling;
    a number n of pressure regulator means, each having an outlet coupled to gas in the upper portion of a different reservoir, for applying a controllable gas pressure thereto; and
    a transparent housing forming said vertical tubes at spaced locations, the outside walls of said housing including a concave region formed by a pair of walls that converge, said converging walls positioned so that two of said tubes appear closer together than their actual separation, to a person viewing said tubes through said pair of walls from a position outside said housing.

* * * * *